United States Patent
Yokoyama (10) Patent No.: US 7,899,013 B2
(45) Date of Patent: Mar. 1, 2011

(54) SYSTEM HAVING OUTPUT DEVICE AND EXTERNAL APPARATUS FOR RECEIVING DATA IN PLACE OF OUTPUT DEVICE, OUTPUT DEVICE, DEVICE FOR ALTERNATIVE RECEPTION, AND THEIR CONTROL METHOD

(75) Inventor: Hidehiko Yokoyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1257 days.

(21) Appl. No.: 10/345,339

(22) Filed: Jan. 16, 2003

(65) Prior Publication Data

US 2003/0137954 A1    Jul. 24, 2003

(30) Foreign Application Priority Data

Jan. 21, 2002   (JP) ............................. 2002-011933

(51) Int. Cl.
*H04W 4/00*    (2009.01)
(52) U.S. Cl. ....................................... 370/331; 370/338
(58) Field of Classification Search ............... 455/41.3, 455/450, 456.6, 418, 419; 370/331, 338; 358/1.13, 1.15, 1.16, 1.18; 379/100.12, 100.15; 709/223
See application file for complete search history.

(56) References Cited

U.S. PATENT DOCUMENTS

| | | | |
|---|---|---|---|
| 2002/0054345 A1* | 5/2002 | Tomida et al. ............. | 358/1.15 |
| 2002/0061744 A1* | 5/2002 | Hamalainen et al. ........ | 455/426 |
| 2002/0063693 A1* | 5/2002 | Aoki et al. .................. | 345/169 |
| 2002/0065042 A1* | 5/2002 | Picoult et al. ................ | 455/41 |
| 2003/0078002 A1* | 4/2003 | Sanjeev et al. ............... | 455/41 |
| 2005/0036476 A1* | 2/2005 | Eaton et al. ................. | 370/349 |

* cited by examiner

*Primary Examiner*—George Eng
*Assistant Examiner*—Michael Faragalla
(74) *Attorney, Agent, or Firm*—Fitzpatrick, Cella, Harper & Scinto (57) ABSTRACT

A system for connecting an output device to an external device via a network is disclosed. The output device includes a radio communication section, a selecting section, and a requesting section. The radio communication section communicates by radio. The selecting section selects the external device as an alternative device for alternatively communicating data by radio with another radio communication device when receiving an output request from a radio communication device. The requesting section requests alternative reception of the output request to the selected external device. The external device includes control section for performing a process which transfers the output request obtained by the radio communication with the other radio communication device to the output device via the network in accordance with the alternative request from the output device.

5 Claims, 12 Drawing Sheets

| BD_ADDR | CoD | ALTERNATIVE MODE |
|---|---|---|
| 002F12345678 | 020300 | ON |
| 002F98765432 | 040000 | OFF |
| 002F01020304 | 020300 | OFF |

FIG. 10A

<NORMAL>

FIG. 10B

<ALTERNATIVE IS OK>

FIG. 10C

<NO ALTERNATIVE>

SYSTEM HAVING OUTPUT DEVICE AND EXTERNAL APPARATUS FOR RECEIVING DATA IN PLACE OF OUTPUT DEVICE, OUTPUT DEVICE, DEVICE FOR ALTERNATIVE RECEPTION, AND THEIR CONTROL METHOD

BACKGROUND OF THE INVENTION

1. Field of the Invention

The present invention relates to a system having an output device and an external apparatus for receiving data in place of the output device, the output device, a device for alternative reception, and their control method.

2. Description of the Related Art

In recent years, increased attention has been paid to the wireless interconnection of electronic devices. One example of such wireless interconnection is Bluetooth (trademark) radio communication.

One particularly useful application of this technology has been to connect mobile electronic devices, such as, for example, mobile phones and personal digital assistants (PDAs), to output devices such as, for example, printing devices. In such arrangements, the electronic device and the outputting device each have radio communication means that allows them to connect via radio waves. This connection enables a user of a mobile electronic device to remotely transmit data to the outputting device. Thus, when the outputting device is a printing device, the user of the mobile electronic device can remotely print from the printing device.

However, the above-mentioned wireless mobile electronic device-printing device connection arrangement is not without drawbacks. For example, conventional radio communication means can only make a single connection between two devices at any one time. As a result, when a radio connection has been established between for example, a mobile electronic device and a printing device, all other mobile electronic area deprived of the use of the printing device until that connection is terminated.

SUMMARY OF THE INVENTION

Accordingly, it is an object of the present invention to, when radio communication with one device has already been performed, obtain an output in response to an output request from another device.

According to a first aspect of the present invention, there is provided a system for connecting an output device to an external device via a network. The output device includes radio communication means for communicating by radio, selecting means for selecting the external device as an alternative device for alternatively communicating data by radio with another radio communication device when receiving an output request from a radio communication device, and requesting means for requesting alternative reception of the output request to the selected external device. The external device includes control means for performing a process which transfers the output request obtained by the radio communication with the other radio communication device to the output device via the wiring network in accordance with the alternative request from the output device.

According to a second aspect of the present invention, there is provided an output device that includes selecting means for selecting an external device as an alternative device for alternatively communicating data by radio with another radio communication device when receiving an output request from a radio communication device, requesting means for requesting alternative reception of the output request to the selected external device, and receiving means for receiving the output request obtained by the radio communication with the other radio communication device by the external device which requested the alternative reception.

According to a third aspect of the present invention, there is provided an alternative processing device for communication with an output device. The alternate processing device includes receiving means for receiving a request for alternative reception of output data from the output device, and control means for, when receiving the request for the alternative reception by the receiving means, alternatively to receive the output data from a radio communication device, and for transmitting the received output data to the output device via a network.

According to a fourth aspect of the present invention, there is provided a system having an output device and an external device. The output device includes alternative requesting means for requesting alternative reception of data to the external device. The external device includes receiving means for receiving output data in place of the output device in response to the request for the alternative reception from the output device, and transfer means for transferring the output data received by the receiving means to the output device.

According to a fifth aspect of the present invention, there is provided an output device that includes first receiving means for receiving data from one device which requests output data, output means for outputting the data received by the first receiving means, alternative requesting means for requesting alternative reception of data to another device, and second receiving means for receiving data which is alternatively received by the other device which requested the alternative reception. The output means outputs the data which is received by the second receiving means.

According to a sixth aspect of the present invention, there is provided a communication device that includes receiving means for receiving data addressed to a first device in place of the first device in accordance with a request from the first device, and transfer means for transferring the received data in place of the first device to the first device.

According to a seventh aspect of the present invention, there is provided a control method in a system for connecting an output device to an external device via a network. The control method includes a selecting step of selecting, by the output device, the external device as an alternative device for alternatively communicating data by radio with another radio communication device when receiving an output request from a radio communication device, a requesting step of requesting, by the output device, alternative reception of an output request to the selected external device, and a control step of performing, by the external device, a process which transfers output request obtained by the radio communication with the other radio communication device to the output device via the network in accordance with the alternative request from the output device.

According to an eighth aspect of the present invention, there is provided a control method of an output device. The method includes a selecting step of selecting an external device as an alternative device for alternatively communicating data with another radio communication device by radio when receiving an output request from a radio communication device, a requesting step of requesting alternative reception of the output request to the selected external device, and a receiving step of receiving the output request obtained by radio communication with the other radio communication device by the external device which requested the alternative via a network.

According to a ninth aspect of the present invention, there is provided a control method of alternative processing for communication with an output device. The method includes a receiving step of receiving a request for alternative reception of output data from the output device, and a control step of starting, when receiving the request for alternative reception in the receiving step, to receive the output data from a radio communication device in place of the output device and transmitting the received output data to the output device via a network.

According to a tenth aspect of the present invention, there is provided a control method of controlling a system having an output device and an external device. The method includes an alternative requesting step of requesting, by the output device, alternative reception of data to the external device, a receiving step of receiving, by the external device, output data in place of the output device in accordance with the request for the alternative reception from the output device, and a transfer step of transferring the data received in the receiving step to the output device.

According to an eleventh aspect of the present invention, there is provided a control method of controlling an output device. The method includes a first receiving step of receiving data from one device which requests output data, an output step of outputting the data received in the first receiving step, an alternative requesting step of requesting the alternative reception of the data to another device, and a second receiving step of receiving the data which is alternatively received by the other device. In the output step, the data which is received in the second receiving step is outputted.

According to a twelfth aspect of the present invention, there is provided a control method of controlling a communication device. The method includes a receiving step of receiving data addressed to a first device in place of the first device in accordance with a request from the first device, and a transfer step of transferring the received data in place of the first device to the first device.

Further objects, features and advantages of the present invention will become apparent from the following description of the preferred embodiments with reference to the attached drawings.

DESCRIPTION OF THE PREFERRED EMBODIMENT

Hereinbelow, a preferred embodiment of the present invention will be described with reference to the drawings.

Figure 1:
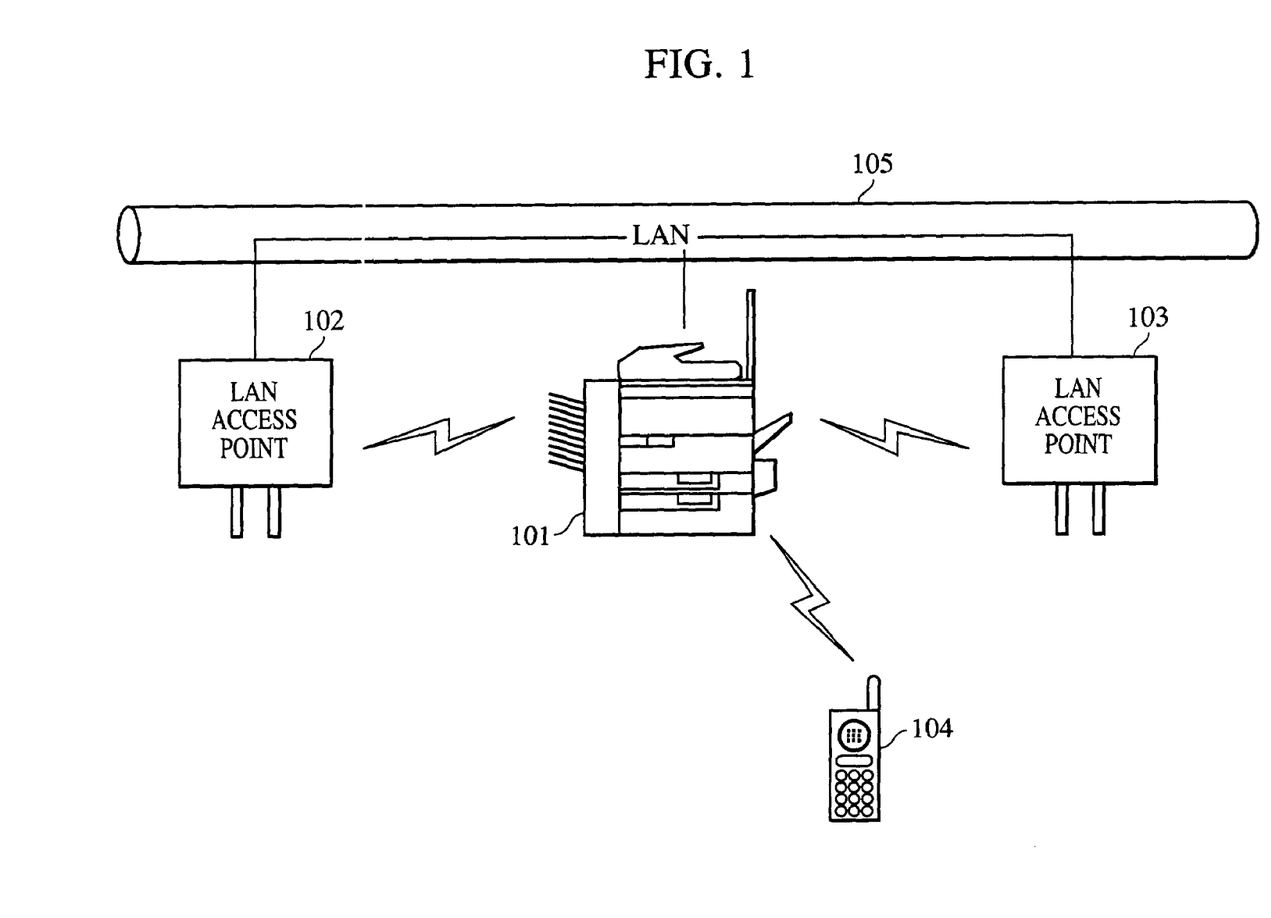
FIG. 1 is a diagram showing the structure of a system according to an embodiment of the present invention.

FIG. 1 is a diagram showing the structure of a system according to an embodiment of the present invention.

Referring to FIG. 1, there is shown a system in which a printing device 101 can communicate data by radio in a Bluetooth (trademark) system, and is connected to a LAN (Local Area Network) 105 such as, for example, Ethernet (trademark). The printing device 101 prints data in response to a printing request from a terminal device 104 such as, for example, a mobile phone by using the radio communication in the Bluetooth system, and can communicate data with another device via the LAN 105. LAN access points 102 and 103 are connected to the LAN 105, and can communicate data by radio in the Bluetooth system. The terminal device 104 can be connected to the LAN 105 via the radio communication in the Bluetooth system.

Figure 2:
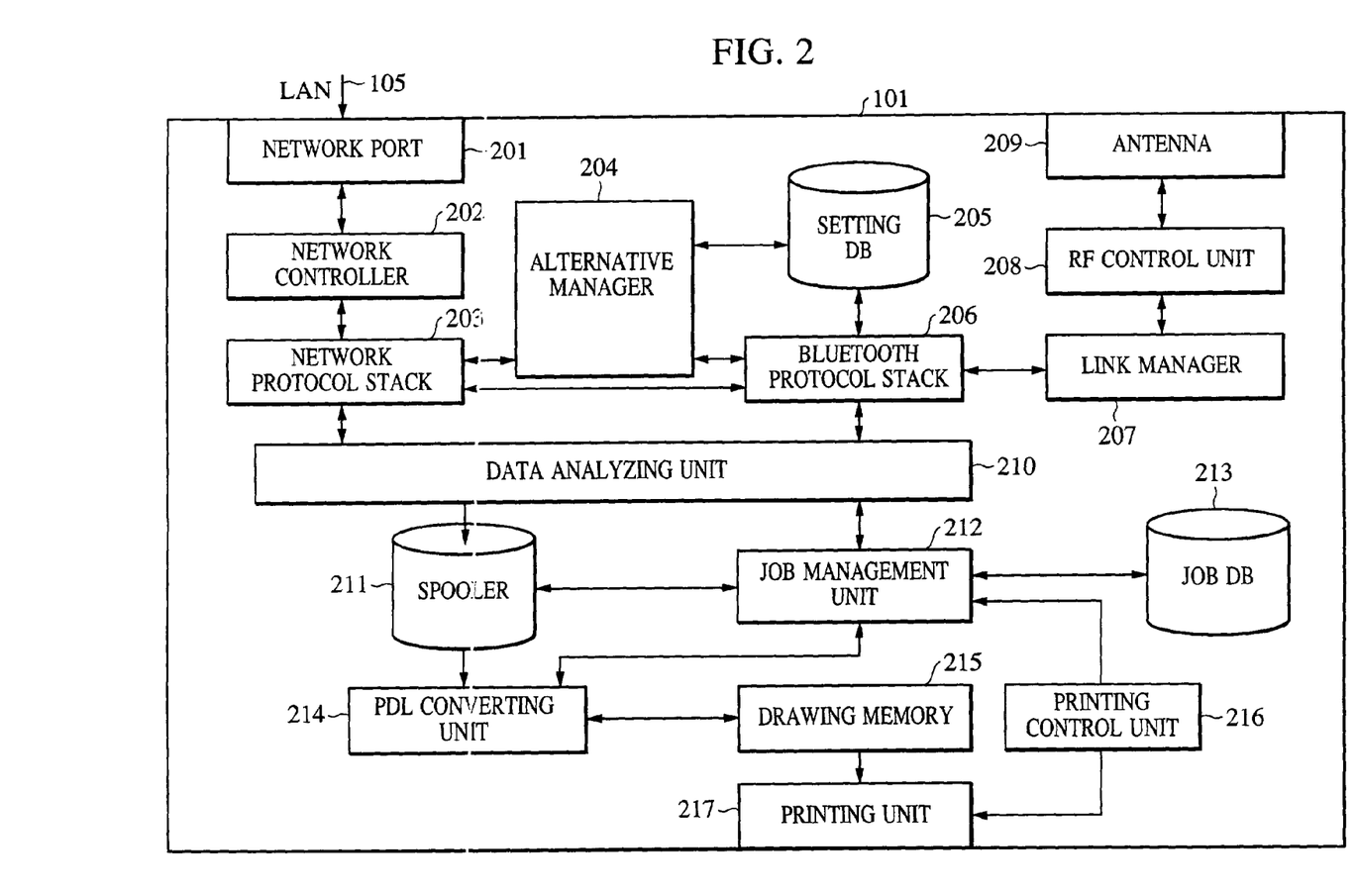
FIG. 2 is a block diagram showing the structure of a printing device shown in FIG. 1.
Figure 3:
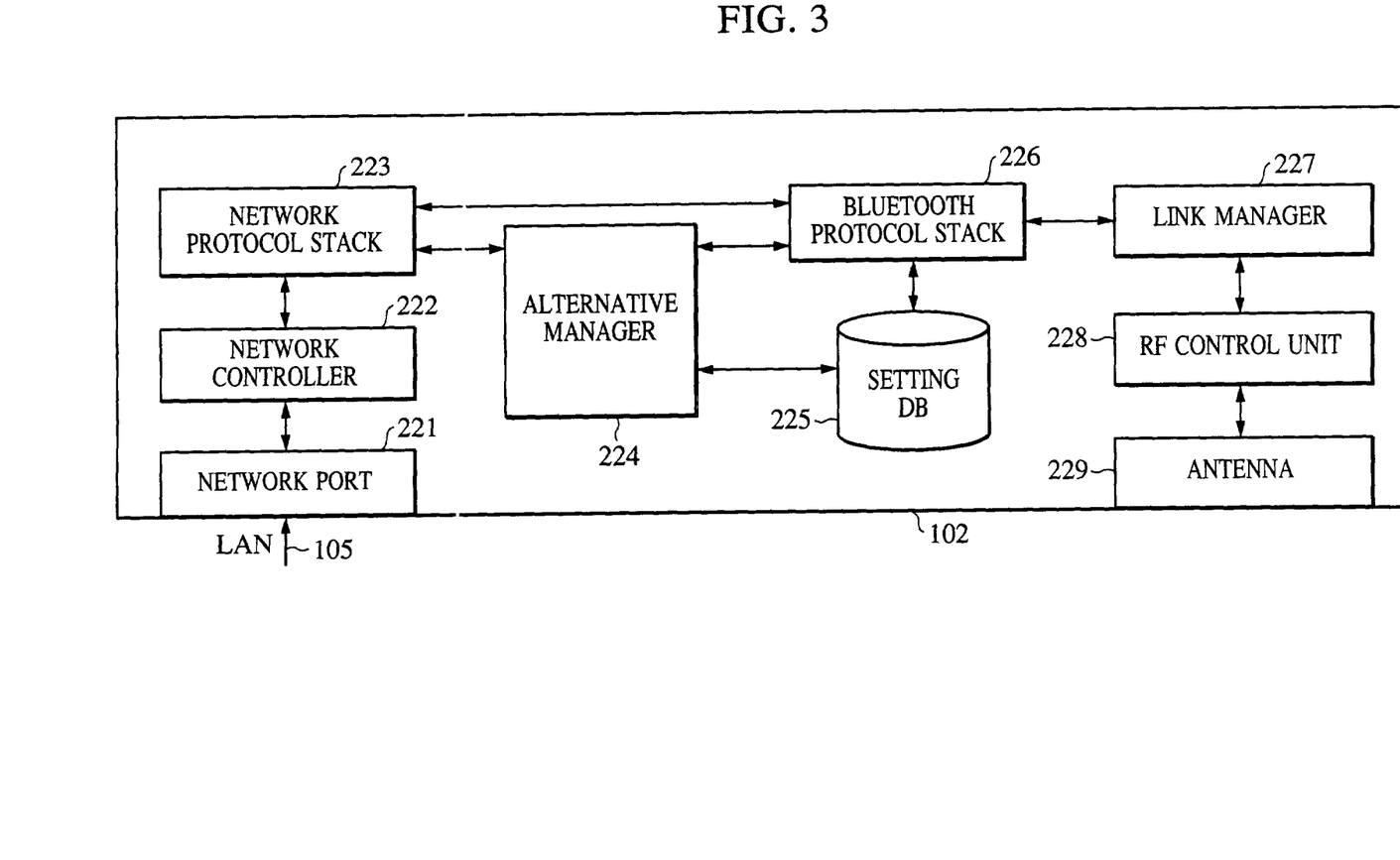
FIG. 3 is a block diagram showing the structure of a LAN access point shown in FIG. 1.

Next, a description is given of the structure of the LAN access points 102 and 103 and the printing device 101 with reference to FIGS. 2 and 3. FIG. 2 is a block diagram showing the structure of the printing device 101 in FIG. 1. FIG. 3 is a block diagram showing the structure of the LAN access points 102 and 103 in FIG. 1.

Referring to FIG. 2, the printing device 101 is connected to the LAN 105 via a network port 201, and can communicate data with the LAN access points 102 and 103 via the LAN 105 (shown in FIG. 1). Information received from the LAN 105 via the network port 201 is transmitted to a network protocol stack 203 via a network controller 202. Information inputted from the network protocol stack 203 is transmitted to the LAN 105 from the network port 201 via the network controller 202.

The network protocol stack 203 resolves the information inputted from the network controller 202 into network protocols, and transmits the information to a data analyzing unit 210, and an alternative manager 204 or the Bluetooth protocol stack 206 in accordance with the information contents. Further, the network protocol stack 203 synthesizes the input information to the network protocols and transmits the information to the network controller 202.

The alternative manager 204 sets CoD (described in detail with reference FIG. 11) stored in a setting database (hereinafter, abbreviated as DB) 205 or a service record (described in detail with reference to FIGS. 10A to 10C) in accordance with a request transmitted from the network protocol stack 203 or Bluetooth protocol stack 206.

The Bluetooth protocol stack 206 resolves the information transmitted from a link manager 207 or from the network protocol stack 203 to the Bluetooth protocols, transmits the information to the data analyzing unit 210 in accordance with the information contents, synthesizes the information inputted from the data analyzing unit 210 or the setting DB 205 to the Bluetooth protocols, and transmits the information to the network protocol stack 203 or the link manager 207.

Under the control of an RF control unit 208, the link manager 207 either transmits the information transmitted from the Bluetooth protocol stack 206 as radio data in the Bluetooth system from an antenna 209 or inversely transmits the radio data received from the antenna 209 to the Bluetooth protocol stack 206 via the RF control unit 208.

The data analyzing unit 210 analyzes the printing request inputted from the network protocol stack 203 or the Bluetooth protocol stack 206, a printer status request, or a job status request. Further, the data analyzing unit 210 issues an instruction to a job management unit 212 and stores the request in a spooler 211 as a job.

The job management unit 212 stores the job in the spooler 211 in response to the instruction from the data analyzing unit 210, and manages the job status by a job DB 213. Further, the job management unit 212 issues an instruction to a PDL (Page Description Language) converting unit 214, converts a PDL identified by the printing device 101 into printing image data, and develops the data to a drawing memory 215. When completing the development of the image data to the drawing memory 215, the job management unit 212 issues an instruction to a printing control unit 216. The printing control unit 216 controls a printing unit 217 so that the image data stored in the drawing memory 215 based on the instruction is printed to a printing medium.

Referring to FIG. 3, under the control of a link manager 227, an RF control unit 228 converts the radio data in the Bluetooth system (hereinafter, referred to the Bluetooth radio data) received from an antenna 229 into digital information at the LAN access points 102 and 103 shown in FIG. 1. The radio data is resolved to the protocols in the Bluetooth protocol stack 226. The digital information synthesized to the protocols is converted into radio information by the RF control unit 228 and is released from the antenna 229 as the Bluetooth radio data.

The Bluetooth protocol stack 226 resolves the information transmitted from a link manager 227 to Bluetooth protocols, transmits the information to the network protocol stack 223, synthesizes the information transmitted from the network protocol stack 223, or the CoD or the service record stored in a setting DB 225 to the Bluetooth protocols, and transmits the information to a link manager 227.

Under the control of the network controller 222, the network protocols stack 223 resolves the information received from the LAN 105 via a network port 221 to network protocols, transmits the protocols to a Bluetooth protocols stack 226 or an alternative manager 224, synthesizes the information received from the Bluetooth protocol stack 226 and an alternative manager 224 to the network protocols, and transmits the information to a designating device from the network port 221.

The alternative manager 224 transmits the CoD or the service record stored in the setting DB 225 in accordance with the alternative request received from the network protocols stack 223, and combines the received CoD or service record to the information stored in the setting DB 225 or deletes them.

Figure 4:
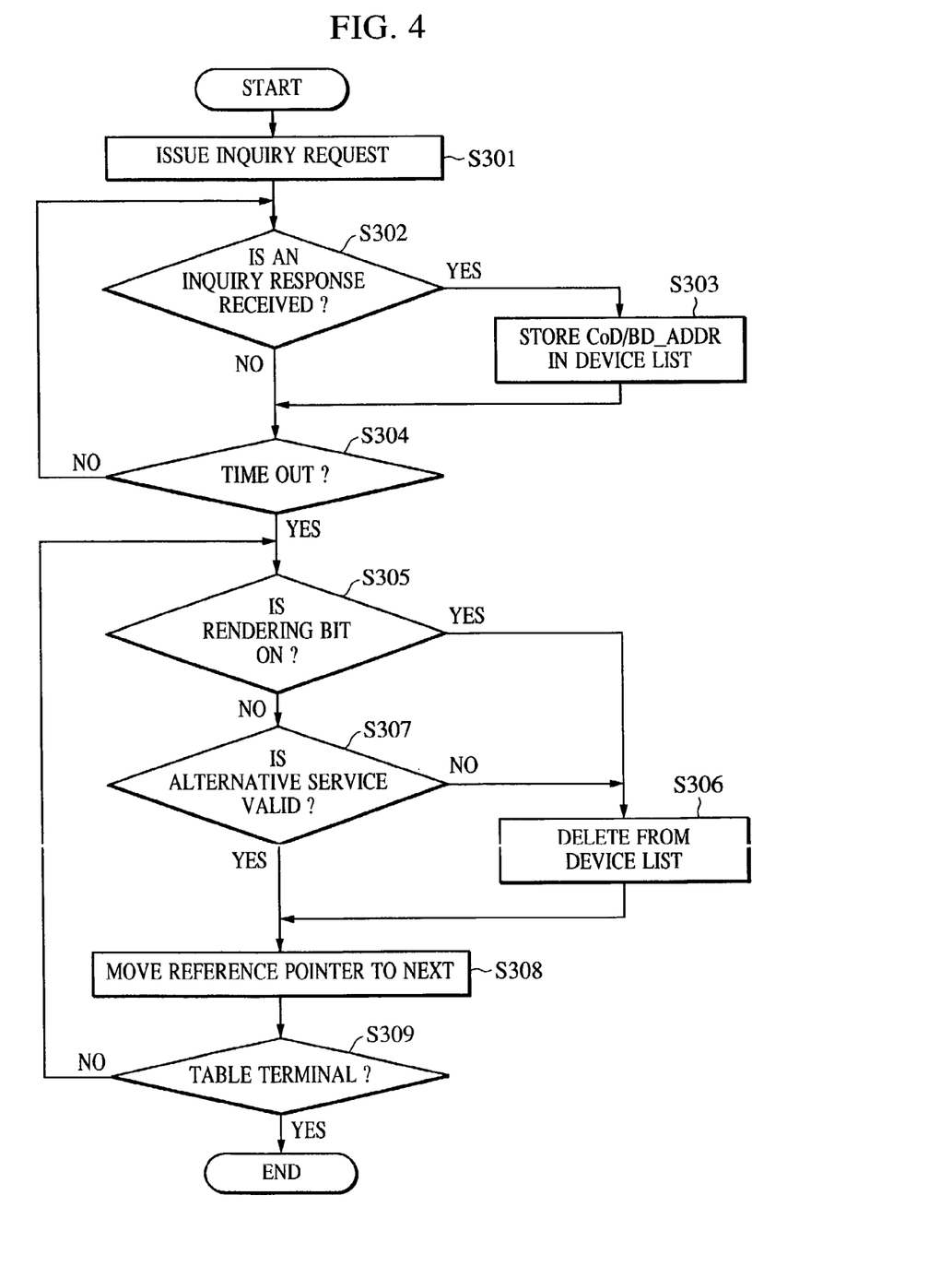
FIG. 4 is a flowchart showing processing for detecting a device for enabling close alternative processing upon starting by the printing device shown in FIG. 2.
Figure 9:
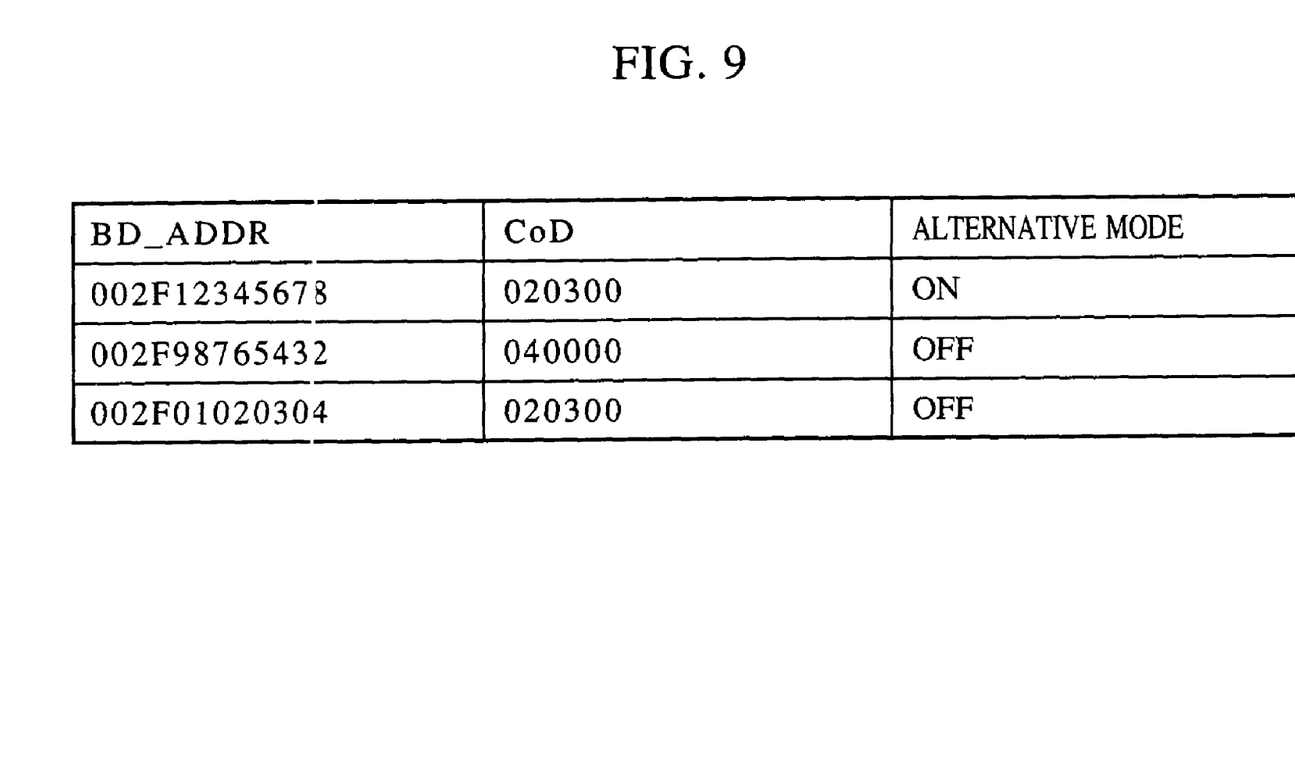
FIG. 9 is a diagram showing one example of an alternative device list stored in the printing device shown in FIG. 2.
Figure 10A:
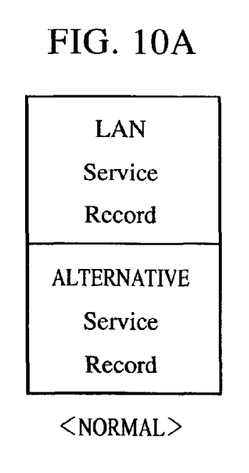
FIGS. 10A to 10C are diagrams showing examples of a service record stored in a setting database (DB) of a LAN access point shown in FIG. 3.
Figures 10B, 10C:
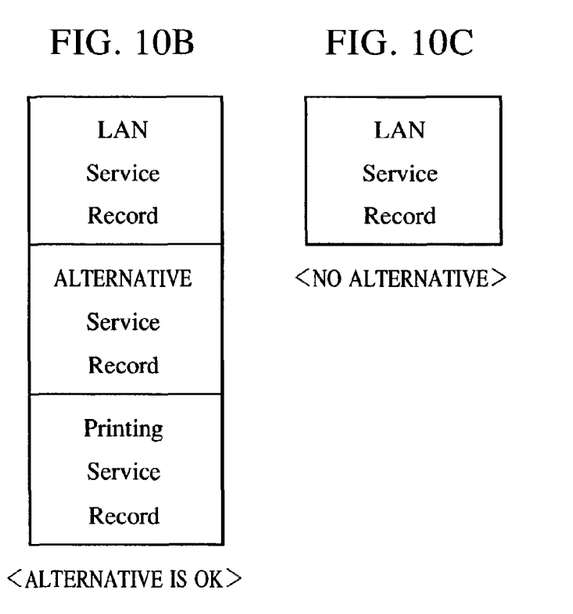
Figure 11:
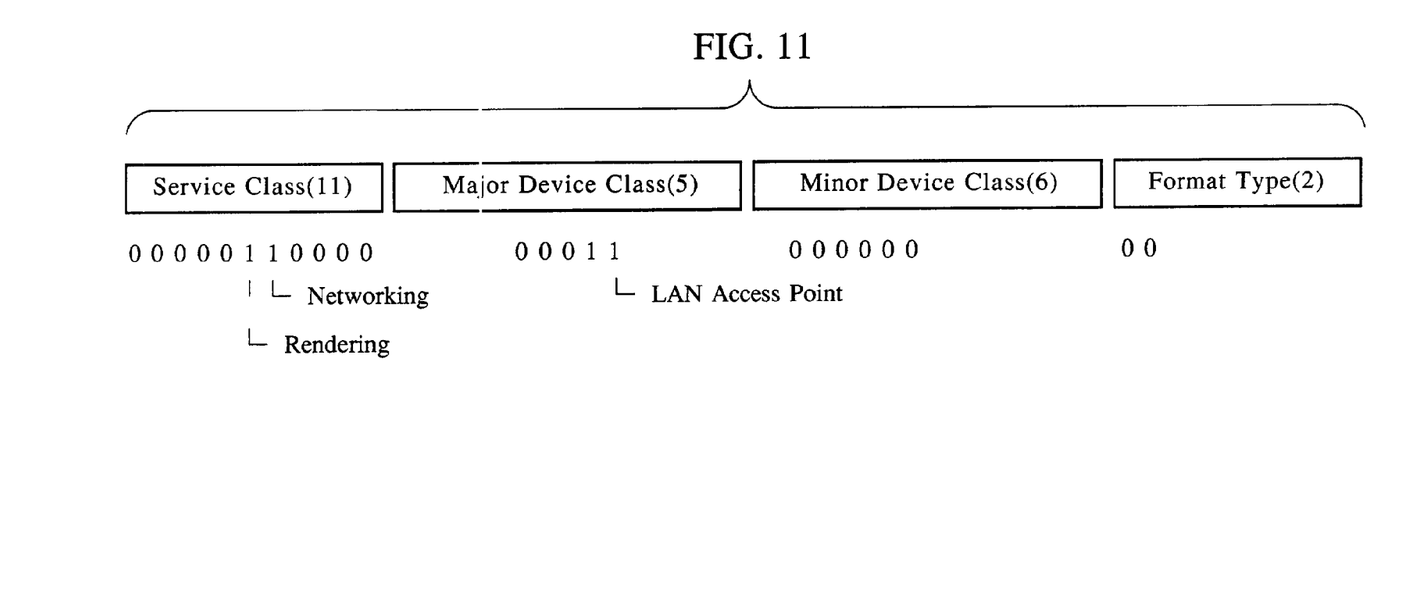
FIG. 11 is a diagram showing an example of the structure of CoD indicating characteristics of a Bluetooth (trademark) device.

Next, a description is given of processing in which the printing device 101 detects a device that performs adjacent alternative processing upon starting with reference to FIGS. 4 and 9 to 11. FIG. 4 is a flowchart showing the processing by which the printing device shown in FIG. 2 detects the device that performs the adjacent alternative processing upon starting by the printing device 101. FIG. 9 is a diagram showing an example of an alternative device list stored in the printing device 101 shown in FIG. 2. FIGS. 10A to 10C are diagrams showing examples of the service record stored in the setting DB 225 at the LAN access point shown in FIG. 3. FIG. 11 is a diagram showing an example of the structure of the CoD indicating characteristics of the Bluetooth device.

Referring to FIG. 4, the printing device 101 is started and then, in step S301, an inquiry request is issued by using Bluetooth radio communication so as to detect a device having an adjacent radio communication function (hereinafter, referred to as a Bluetooth device). In step S302, it is determined whether or not an inquiry response to the inquiry request issued in step S301 is received. When it is determined that the inquiry response is received, the processing routine advances to step S303.

In step S303, the printing device 101 registers a BD_ADDR (Bluetooth Device Address) which can uniquely identify the Bluetooth device and the CoD indicating the type of Bluetooth devices in the alternative device list shown in FIG. 9. The alternative device list exists in the setting DB 205 (shown in FIG. 2) of the printing device 101. Then, the processing routine advances to step S304.

When it is determined in step S302 that the inquiry response is not received, the processing routine skips step S303 and advances to step S304.

In step S304, it is determined whether or not a predetermined time-out period has passed. When it is determined that the time-out period has not passed, the processing in steps S302 and step S303 is repeated. When it is determined that the time-out period has passed, in step S305, it is determined whether or not a rendering bit (corresponding to the sixth bit from the left end in FIG. 11) indicating the printing device 101 is 1. When it is determined that the rendering bit is 1, it is determined that the device is the printing device 101. However, when requesting the alternative processing to the printing device, the terminal device 104 cannot determine which device prints the information. Therefore, in step S306, the device is deleted from the alternative device list shown in FIG. 9. Then, the processing routine advances to step S308.

On the other hand, when it is determined that the rendering bit is not 1, in step S307, it is determined by using an SDP (Service Discovery Protocol) of the Bluetooth radio communication for the device indicated by an identification address described in the BD_ADDR column of a reference device in the alternative device list shown in FIG. 9, whether or not the service record for the alternative processing exists to indicate that the alternative processing is valid. Referring to FIGS. 10A to 10C, the Bluetooth devices have the service records having characteristics of the service which can be processed by the device. When it is determined that the service record for the alternative processing does not exist, the Bluetooth device cannot perform the alternative processing. Thus, in step S306, the information on the Bluetooth device is deleted from the alternative device list. The processing routine advances to step S308. When it is determined that the service record for alternative processing exists, the processing routine advances to step S308.

In step S308, the reference device is set to the next one in the alternative device list. In step S309, it is determined whether or not the reference device reaches a terminal device of the alternative device list. If it is determined that the reference device does not reach the terminal one of the alternative device list, the processing routine returns to step S305 whereupon the processing subsequent to step S305 is repeated until the reference device reaches the terminal one of the alternative device list.

Through the above-mentioned processing, the alternative device list shown in FIG. 9 registers the Cod and the BD_ADDR of the Bluetooth device having the alternative processing function, which is connected to the printing device 101 by using the Bluetooth radio communication.

According to the embodiment, the above-mentioned alternative device list uses an alternative device list which registers an alternative flag indicating whether the close Bluetooth device indicates the BD_ADDR, the CoD, or the alternative processing as shown in FIG. 9. This determination indicated by the alternative flag is detected by issuing the inquiry request upon starting the printing device 101 shown in FIG. 1. According to the embodiment, three Bluetooth devices are registered in the alternative device list.

FIGS. 10A to 10C show the service records which are stored in the setting DB 225 at the LAN access points 102 and 103 shown in FIG. 1. According to the embodiment, the setting DB 225 stores the service records for providing a normal LAN access as shown in FIG. 10A, the service records when the request for the alternative processing is OK as shown in FIG. 10B, and the service record when the alternative processing is impossible as shown in FIG. 10C.

Referring to FIG. 11, the CoD is 24-bit data comprising a service class of 11 bits indicating the type of services provided by the Bluetooth device, a major device class of 5 bits indicating the major class type of the Bluetooth devices, a minor device class of 6 bits indicating the minor device class every major device class, and a format type of 2 bits indicating the CoD data format. According to the embodiment, the sixth bit from the left of the service class is a rendering service indicating a printer, and the seventh bit indicates a network service for providing the connection to the LAN. In the class type, the fourth bit and the fifth bit from the left of the major device class is 1 indicating the LAN access point.

Figure 5:
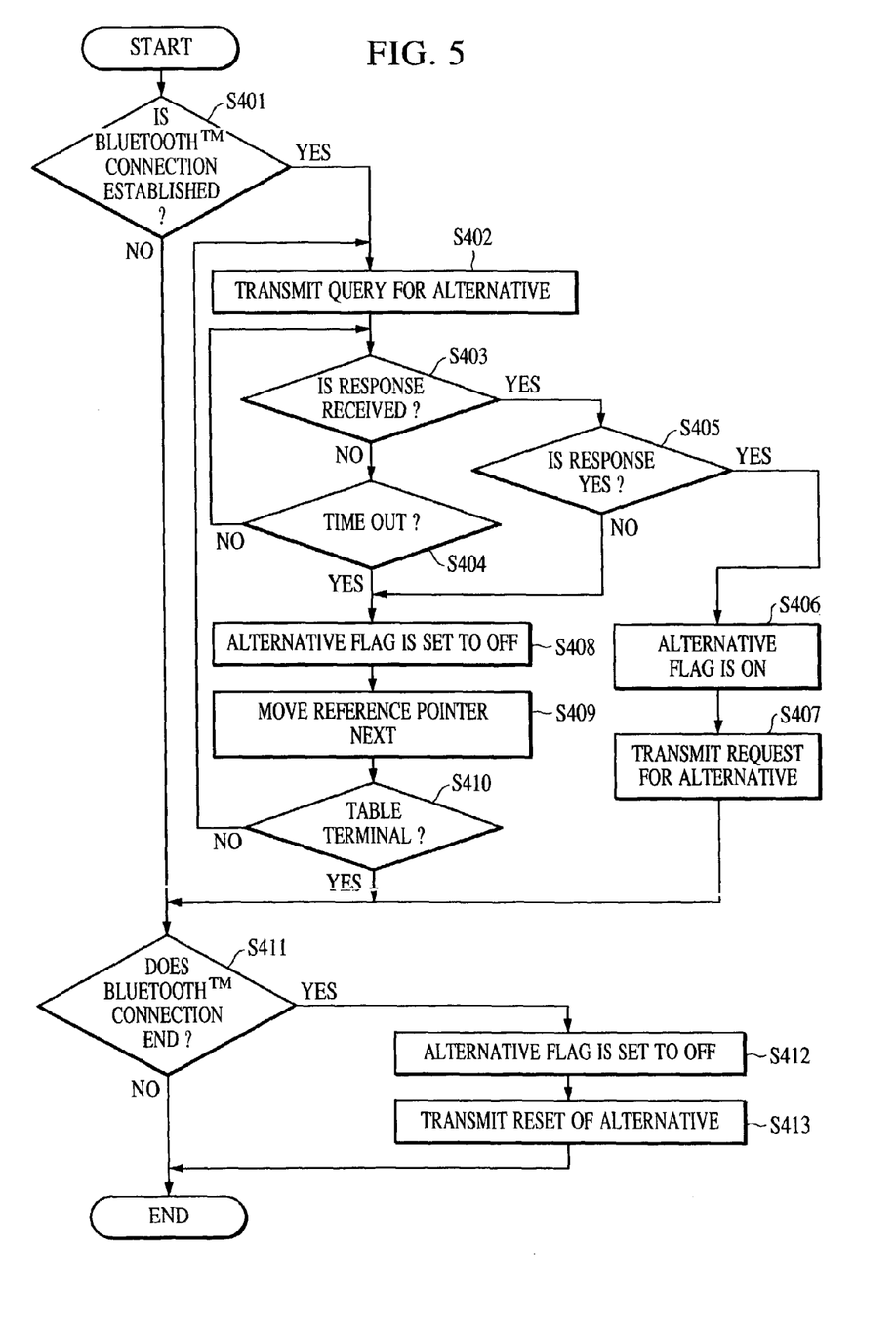
FIG. 5 is a flowchart showing a request of the alternative processing by the printing device shown in FIG. 1.

Next, a description is given of the request for the alternative processing by the printing device 101 with reference to FIG. 5. FIG. 5 is a flowchart showing the request for the alternative processing by the printing device 101 shown in FIG. 1.

Referring to FIG. 5, to request the alternative processing by the printing device 101, in step S401, it is determined whether or not the printing device 101 is connected to an arbitrary Bluetooth device by radio. If the radio connection is established, in step S402, the query for the alternative processing is sequentially transmitted via the LAN 105 to the Bluetooth devices starting from that described at the head of the alternative list shown in FIG. 9. In step S403, it is determined whether or not the response for the query for the alternative processing is received. When it is determined that the response is not received, in step S404, it is determined whether or not the time-out period has passed. If it is determined that the time-out period has not passed, step S403 is repeated until the time-out period has passed. When the response is received from the Bluetooth device that requests the alternative processing, the processing routine advances to step S405. On the other hand, when it is determined that the time-out period has passed, the processing routine advances to step S408.

In step S405, it is determined whether or not the received response is YES. When it is determined that the received response is YES, in step S406, an alternative flag column of the Bluetooth device which requests the alternative processing is set to ON in the alternative device list shown in FIG. 9. In step S407, the alternative request is transmitted to the Bluetooth device which requests the alternative processing including the Cod and printing service record of the printing device 101.

On the other hand, when it is determined in step S405 that the received response is not YES, that is, when it is determined that the received response is NO, the processing routine advances to step S408.

In step S408, the alternative flag column of the Bluetooth device which requests the alternative processing is set to OFF in the alternative device list shown in FIG. 9. In step S409, a reference pointer indicating the Bluetooth device which is referred to advances to the next one in the alternative device list shown in FIG. 9. In step S410, it is determined whether or not the reference pointer passes through the last line of the alternative device list. If it is determined that the reference pointer does not pass, the processing routine returns to step S402 and the processing subsequent to step S402 is repeated. On the other hand, if it is determined that the reference pointer passes through the last line of the alternative device list, the processing routine advances to step S411.

In step S411, it is determined whether or not the Bluetooth radio connection to the Bluetooth device ends. If it is determined that the Bluetooth radio connection ends, in step S412, the alternative flag is set to OFF. In step S413, the request for resetting the alternative processing is transmitted to the Bluetooth device which request the alternative processing via the LAN 105.

Figure 6:
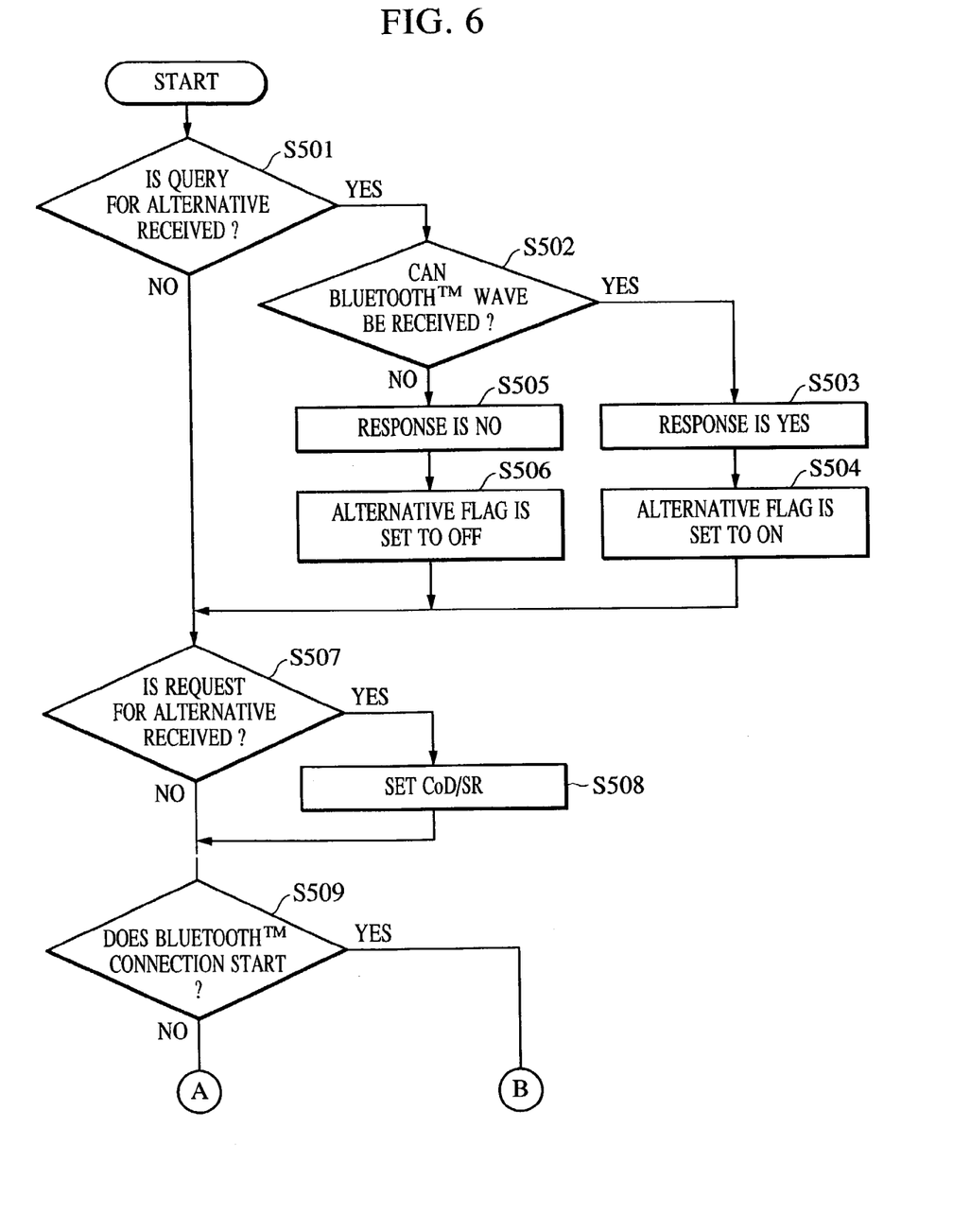
FIG. 6 is a flowchart showing one processing of the LAN access point shown in FIG. 1.
Figure 7:
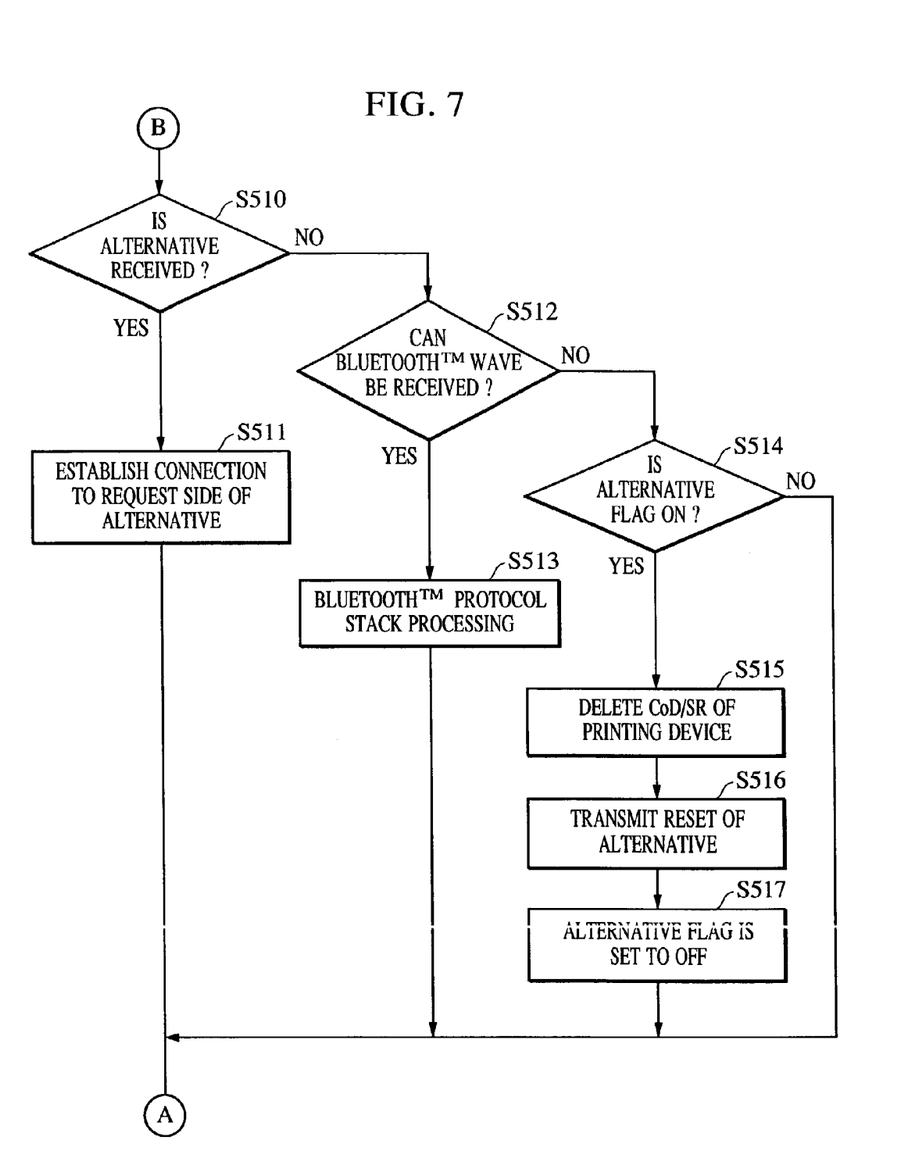
FIG. 7 is a flowchart showing another processing of the LAN access point shown in FIG. 1.
Figure 8:
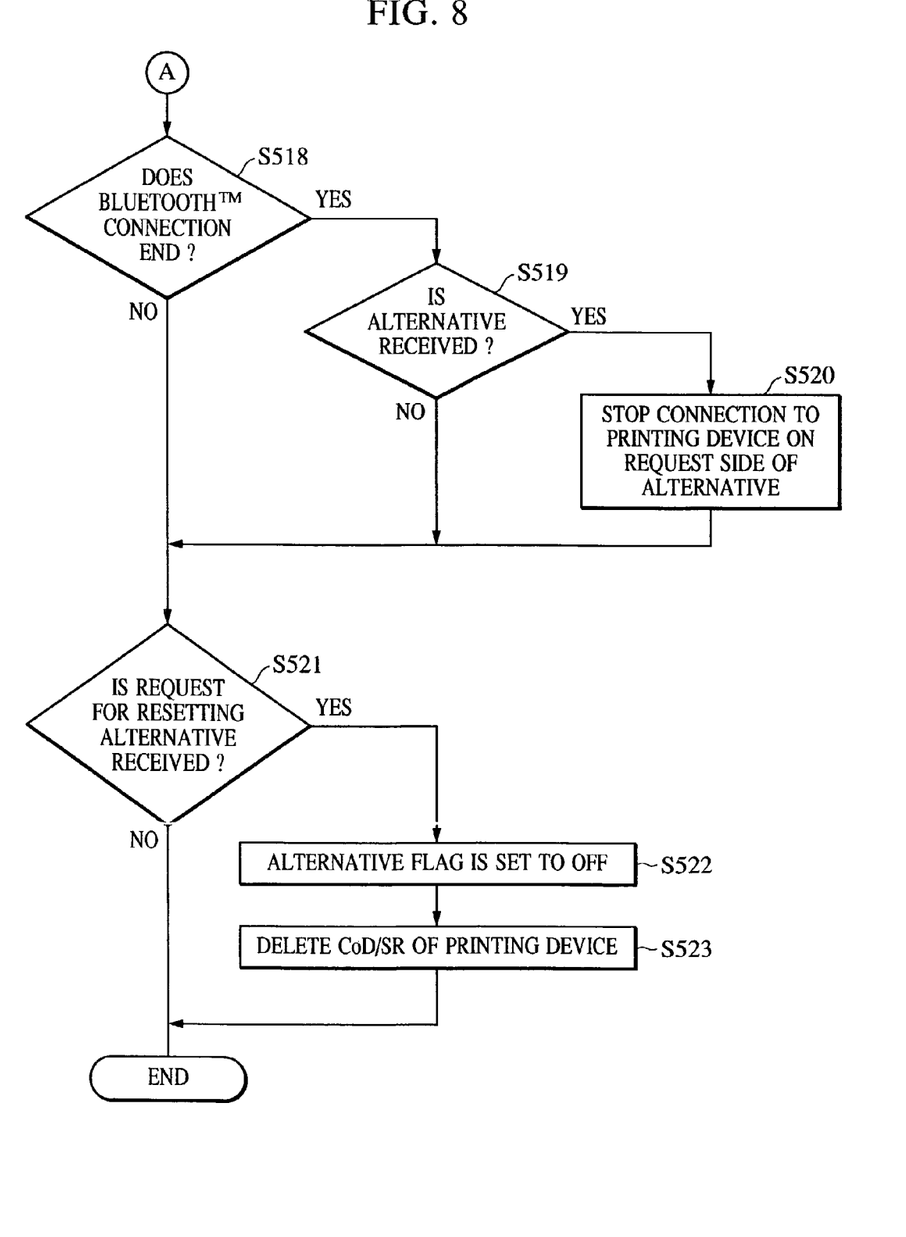
FIG. 8 is a flowchart showing further another processing of the LAN access point shown in FIG. 1.
Figure 12:
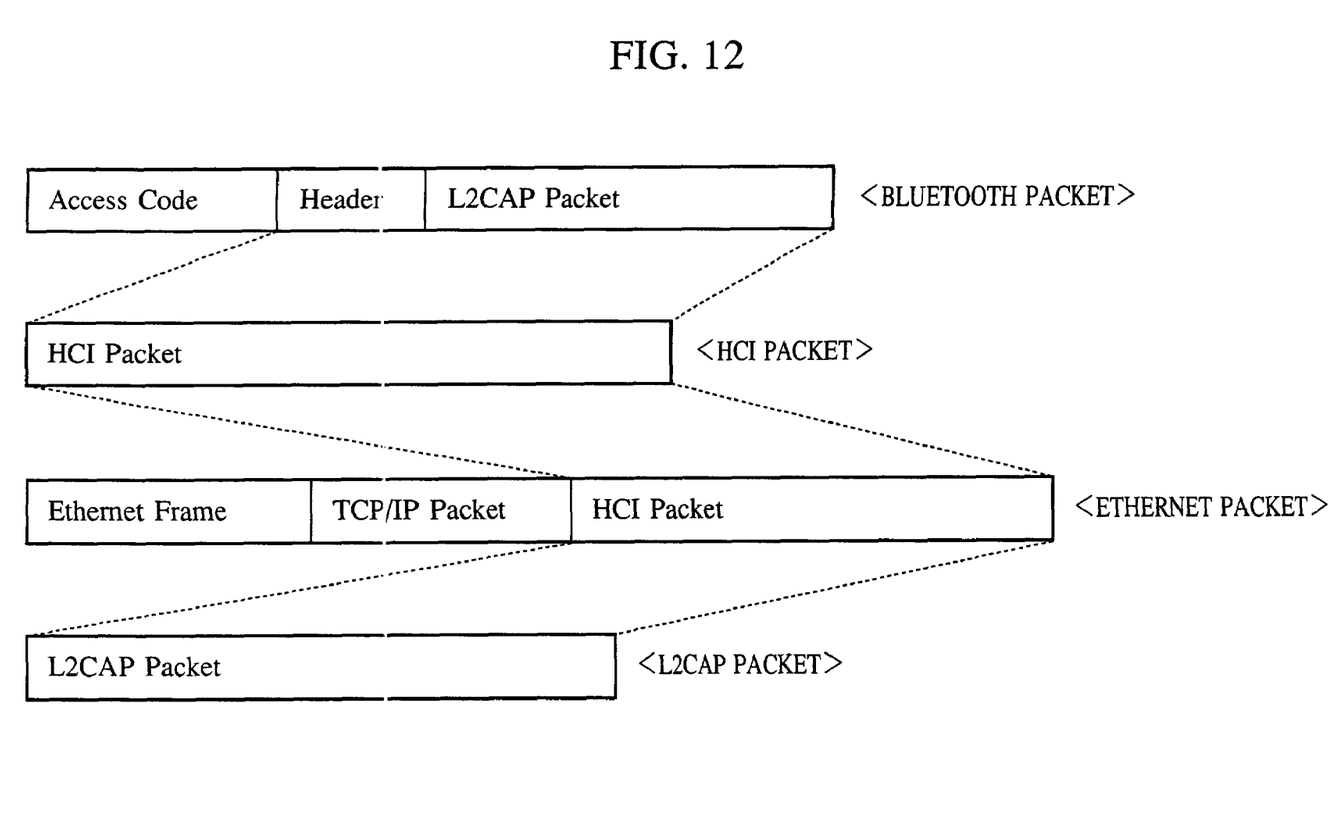
FIG. 12 is a diagram showing an example of a packet format in BLUETOOTH (trademark) radio communication and ETHERNET (trademark) communication at the LAN access point shown in FIG. 1.

Next, a description is given of processing of the LAN access points 102 and 103 with reference to FIGS. 6 to 8, and 12. FIGS. 6 to 8 are flowcharts showing the processing at the LAN access points 102 and 103 in FIG. 1. FIG. 12 is a diagram showing an example of a packet format in the Bluetooth radio communication and the Ethernet (trademark) at the LAN access points 102 and 103 in FIG. 1.

Referring to FIG. 6, at the LAN access point 102, it is determined in step S501 whether or not the query for the alternative processing from the printing device 101 is received via the LAN 105. If it is determined that the query for the alternative processing is not received, the processing routine advances to step S507. On the other hand, if it is determined that the query for the alternative processing is received, it is determined in step S502 that the Bluetooth radio communication can be performed. If it is determined that the Bluetooth radio communication can be performed, in step S503, a response YES is transmitted via the LAN 105 to the printing device 101 which transmits the query for the alternative processing. In step S504, the alternative flag in the setting DB 225 (refer to FIG. 3) at the LAN access point 102 is set to ON. Then, the processing routine advances to step S507.

On the other hand, if it is determined in step S502 that the Bluetooth radio communication is impossible because the LAN access point 102 has already communicated data with another Bluetooth device, in step S505, a response NO is transmitted via the LAN 105 to the printing device 101 which transmits the query for the alternative processing. In step S506, the alternative flag is set to OFF. Then, the processing routine advances to step S507.

In step S507, it is determined whether or not the request for the alternative processing is received. If it is determined that the request for the alternative processing is received, in step S508, the CoD and printing service record of the printing device 101 shown in FIG. 1 included in the request for the alternative processing are combined to the CoD and the service record table of the Bluetooth device, which is stored in the setting DB 225. Then, the processing routing advances to step S509. On the other hand, if it is determined that the request for the alternative processing is not received, the processing routine skips step S508 and advances to step S509.

In step S509, it is determined whether or not the Bluetooth radio connection is established. If it is determined that the Bluetooth radio connection is not established, the processing routine advances to step S518 in FIG. 8. The Bluetooth radio connection is established and then in step S510 in FIG. 7 it is determined whether or not the connection is connection established by the alternative processing. If it is determined that the connection is connection established by the alternative processing, that is, the printing request, in step S511, the connection to the printing device 101 which requests the alternative processing is established via the LAN 105. Herein, the connection to the printing device 101 which requests the alternative processing via the LAN 105 causes temporary conversion of L2CAP (Logical Link Control and Adaptation Protocol) data transmitted to the Bluetooth protocol stack 226 at the LAN access point 102 into an HCI (Host Control Interface) packet. Thereafter, the packet is transmitted to the network protocol stack 223 and is synthesized into an Ethernet (trademark) packet. Then, via the LAN 105, the Ethernet (trademark) packet is converted into the HCI packet by the Ethernet protocol stack 203 of the printing device 101. Finally, the printing request is transferred to the Bluetooth protocol stack 206. Thus, the printing request from the terminal device 104 which is received by the LAN access point 102 is processed by the Bluetooth protocol stack 206 of the printing device 101 and is printed by the printing unit 217. After establishing the connection, the processing routine advances to step S518 in FIG. 8.

On the other hand, when it is determined in step S510 that the connection is not established by the alternative processing, that is, when the LAN access is requested, in step S512, it is determined whether or not the Bluetooth radio communication can be performed. Since the Bluetooth radio connection has already been established, a new Bluetooth radio connection can be established so that two or more Bluetooth radio connections can be performed. That is, since the alternative processing is not performed, the above determination is performed. If it is determined that the Bluetooth radio connection is possible, in step S513, the Bluetooth protocol stack 226 performs the processing of the reception data. Then, the processing routine advances to step S518.

If it is determined in step S512 that the Bluetooth radio connection is impossible, in step S514, it is determined whether or not the alternative flag indicating the processing enters the alternative processing is set to ON. If it is determined that the alternative flag is set to ON, the processing enters the alternative processing. Thus, in step S515, a portion of the printing device 101 which requests the alternative processing is deleted from the service record and the CoD stored in the setting DB225. In step S516, the notification indicating the reset of the alternative processing is transmitted via the LAN 105 to the printing device 101 which requests the alternative processing. In step S517, the alternative flag is set to OFF. Then, the processing routine advances to step S518.

In step S518, it is determined whether or not the Bluetooth radio connection ends. If it is determined that the Bluetooth radio connection ends, in step S519, it is determined whether or not the radio connection is reception of the alternative processing. If it is determined that the radio connection is the reception of the alternative processing, in step S520, the network connection to the printing device 101 which requests the alternative processing via the LAN 105 is disconnected. Then, the processing routine advances to step S521. On the other hand, if it is determined that the radio connection is not the reception of the alternative processing, the processing routine skips step S520 and advances to step S521.

In step S521, it is determined whether or not the request for resetting the alternative processing is received from the printing device 101 which requests the request for the alternative processing. If it is determined that the request for resetting the alternative processing is received, in step S522, the alternative flag indicating that the alternative processing is performed is set to OFF. In step S523, the CoD and the service record of the printing device 101 which requests the reset of the alternative processing is deleted from the setting DB 225. Then, the processing routine ends. If it is determined that the request for resetting the alternative processing is not received, the processing routine skips steps S522 and S523 and then ends, and the processing shown in FIG. 6 is repeated.

As mentioned above, according to the embodiment, when the Bluetooth radio communication has already been established and the radio communication with another mobile device is impossible, the printing device 101 requests the alternative processing to the registered Bluetooth device (herein, at the LAN access point 102 or 103) via the LAN 105. In the Bluetooth device which receives the alternative processing, the radio communication is performed with the terminal device 104 such as a PDA or a mobile phone which requests the printing. The printing request obtained from the terminal device 104 is transferred to the printing device 101 via the LAN 105. As a result, the conventional terminal device which could not issue the printing request until the established radio communication ends can transmit the printing request at an arbitrary timing and can perform the printing processing.

According to the embodiment, the printing device 101 requests the alternative processing to the single Bluetooth device. However, when a plurality of Bluetooth devices which can perform the alternative processing exist as shown in the alternative device table in FIG. 9, the alternative processing can be requested to all the Bluetooth devices. In this case, since a plurality of Bluetooth devices operate as alternative processing devices of the printing device 101, the printing request from the mobile terminal which desires the printing can be transmitted within a wider range.

According to the embodiment, at the LAN access point 102, the Bluetooth protocol stack 226 converts the L2CAP packet including the printing request from the terminal device 104 into the HCI packet which can become abstract and can correspond to an arbitrary transfer form. However, instead of the conversion into the HCI packet, the L2CAP packet may be synthesized to the Ethernet (trademark) packet by the network protocol stack 223. In this case, the conversion from the L2CAP packet to the HCI packet and the conversion from the HCI packet to the L2CAP packet are unnecessary at the LAN access point 102 and in the printing device 101, thus increasing the processing speed.

Further, according to the embodiment, the example of the printing device having the Bluetooth radio communication function is described. However, an adaptor such as a card having the Bluetooth radio communication function may be connected to the printing device.

Furthermore, according to the embodiment, the example of the communication of the printing device with the single Bluetooth device is described. However, when the printing device communicates data with a plurality of Bluetooth devices, for example, with the maximum number of Bluetooth devices, the request for the alternative processing may be performed.

In addition, according to the embodiment, the example of the printing device is described. However, in the case of other devices using a method excluding the printing one, such as an output device for outputting data, a server for storing received data (e.g., uploaded data), and the like, the reception of the alternative processing of the present invention may be applied.

As mentioned above, in the present invention, when data has already been communicated by radio with one device, data can be printed out in response to the printing request from another device.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A system having a printing apparatus and a plurality of external apparatuses each of which is a local area network (LAN) access point connected to the printing apparatus by a wired network, wherein the printing apparatus comprises:
    a wireless communication unit constructed to communicate by a wireless communication;
    a searching unit constructed to search the plurality of external apparatuses for at least one alternative wireless receiving apparatus that receives printing data in place of the printing apparatus;
    a selecting unit constructed to select one alternative wireless receiving apparatus from among the at least one alternative wireless receiving apparatus searched by the searching unit, in response to the printing apparatus being wirelessly connected to a first wireless communication apparatus, wherein the printing apparatus is unable to wirelessly communicate with other wireless communication apparatuses during a period of the printing apparatus being wirelessly connected to the first wireless communication apparatus;
    a requesting unit constructed to request, via the wired network, said selected alternative wireless receiving apparatus to perform alternative wireless receiving of the printing data from one of the other wireless communication apparatuses;
    a receiving unit constructed to receive the printing data from the requested alternative wireless receiving apparatus via the wired network, wherein said receiving unit receives the printing data that is received by the requested alternative wireless receiving apparatus, in place of the printing apparatus;
    a printing unit constructed to print the printing data received by said receiving unit; and
    a resetting unit constructed to reset the request to perform alternative wireless receiving by the alternative wireless receiving apparatus, in response to a release of the wireless connection to the first wireless communication apparatus.

2. A printing apparatus that is connected to a wired network which is connected by wire to a plurality of external apparatuses, each of which is a local area network (LAN) access point, said printing apparatus comprising:
    a wireless communication unit constructed to communicate by a wireless communication;
    a searching unit constructed to search the plurality of external apparatuses for at least one alternative wireless receiving apparatus that receives printing data in place of the printing apparatus;
    a selecting unit constructed to select one alternative wireless receiving apparatus from among the at least one alternative wireless receiving apparatus searched by the searching unit, in response to the printing apparatus being wirelessly connected to a first wireless communication apparatus, wherein the printing apparatus is unable to wirelessly communicate with other wireless communication apparatuses during a period of the printing apparatus being wirelessly connected to the first wireless communication apparatus;
    a requesting unit constructed to request, via a wired network, the selected alternative wireless receiving apparatus to perform alternative wireless receiving of the printing data from one of the other wireless communication apparatuses;
    a receiving unit constructed to receive the printing data from the requested alternative wireless receiving apparatus via the wired network, wherein said receiving unit receives the printing data that is received by the requested alternative wireless receiving apparatus, in place of the printing apparatus;
    a printing unit constructed to print the printing data received by said receiving unit; and
    a resetting unit constructed to reset the request to perform alternative wireless receiving by the alternative wireless receiving apparatus, in response to a release of the wireless connection to the first wireless communication apparatus.

3. A printing apparatus according to claim 2, wherein said search unit searches for the at least one alternative wireless receiving apparatus in accordance with a Bluetooth communication sequence.

4. A control method in a system having a printing apparatus and a plurality of external apparatuses each of which is a local area network (LAN) access point connected to the printing apparatus by a wired network, said control method comprising:
    a wireless communication step of communicating by a wireless communication;
    a searching step of searching the plurality of external apparatuses for at least one alternative wireless receiving apparatus that receives printing data in place of the printing apparatus;
    a selecting step of selecting, by the printing apparatus, one alternative wireless receiving apparatus from among the at least one alternative wireless receiving apparatus searched in the searching step, in response to the printing apparatus being wirelessly connected to a first wireless communication apparatus, wherein the printing apparatus is unable to wirelessly communicate with other wireless communication apparatuses during a period of the printing apparatus being wirelessly connected to the first wireless communication apparatus;
    a requesting step of requesting, via the wired network, by the printing apparatus, the selected alternative wireless receiving apparatus to perform alternative wireless receiving of the printing data from one of the other wireless communication apparatuses;
    a receiving step of receiving the printing data from the requested alternative wireless receiving apparatus via the wired network, wherein the printing data is received by the requested alternative wireless receiving apparatus, in place of the printing apparatus;
    a printing step of printing data received in the receiving step; and
    a resetting step of resetting the request to perform alternative wireless receiving by the alternative wireless receiving apparatus, in response to a release of the wireless connection to the first wireless communication apparatus.

5. A control method of controlling a printing apparatus connected to a wired network which is connected by wire to a plurality of external apparatuses, each of which is a local area network (LAN) access point, said method comprising:

a wireless communication step of communicating by a wireless communication;

a searching step of searching the plurality of external apparatuses for at least one alternative wireless receiving apparatus that receives printing data in place of the printing apparatus;

a selecting step of selecting one alternative wireless receiving apparatus from among the at least one alternative wireless receiving apparatus searched in the searching step, in response to the printing apparatus being wirelessly connected to the first wireless communication apparatus, wherein the printing apparatus is unable to wirelessly communicate with other wireless communication apparatuses during a period of the printing apparatus being wirelessly connected to the first wireless communication apparatus;

a requesting step of requesting, via a wired network, the selected alternative wireless receiving apparatus to perform alternative wireless receiving of the printing data from one of the other wireless communication apparatuses;

a receiving step of receiving the printing data from the requested alternative wireless receiving apparatus via the wired network, wherein the printing data is received by the requested alternative wireless receiving apparatus, in place of the printing apparatus;

a printing step of printing the printing data received in the receiving step; and a resetting step of resetting the request to perform alternative wireless receiving by the alternative wireless receiving apparatus, in response to a release of the wireless connection to the first wireless communication apparatus.

* * * * *